United States Patent [19]

Seki et al.

[11] Patent Number: 5,678,229
[45] Date of Patent: Oct. 14, 1997

[54] BATTERY-POWERED ACCESSORY FOR RADIO DATA COMMUNICATION OF A DATA PROCESSING APPARATUS

[75] Inventors: Kenji Seki; Kouhei Nishiyama; Yukihiro Kanno, all of Tokyo, Japan

[73] Assignee: NEC Corporation, Tokyo, Japan

[21] Appl. No.: 515,014

[22] Filed: Aug. 14, 1995

[30] Foreign Application Priority Data

Aug. 15, 1994 [JP] Japan .................. 6-211739

[51] Int. Cl.⁶ .................................. H04B 1/38
[52] U.S. Cl. ................. 455/343; 455/89; 455/127; 375/222; 379/58
[58] Field of Search ................. 455/343, 38.3, 455/38.2, 74, 66, 89, 100, 67.7, 127, 115, 38.5; 364/707; 395/750; 375/222; 379/58, 59

[56] References Cited

U.S. PATENT DOCUMENTS

| | | | |
|---|---|---|---|
| 5,239,694 | 8/1993 | Toyoshima | 455/115 |
| 5,392,023 | 2/1995 | D'Avello et al. | 358/400 |
| 5,408,520 | 4/1995 | Clark et al. | 379/93 |

FOREIGN PATENT DOCUMENTS

| | | |
|---|---|---|
| 0203781A1 | 12/1986 | European Pat. Off. . |
| 0605241A1 | 7/1994 | European Pat. Off. . |
| 28251 | 1/1990 | Japan . |
| 9323934 | 11/1993 | WIPO . |

*Primary Examiner*—Reinhard J. Eisenzopf
*Assistant Examiner*—Lee Nguyen
*Attorney, Agent, or Firm*—Whitham, Curtis, Whitham & McGinn

[57] ABSTRACT

A battery-powered accessory monitors an output voltage reduction of the battery as well as the amount of transmitting/receiving data at all times. When a voltage drop of the battery is detected, the accessory displays communication information including the amount of data which have been sent or received by that time. The data transmission brings to a halt at the time when the battery voltage drop is detected. Since a user can easily obtain the communication information through the display, it is immediately determined whether all the data have been transmitted. Furthermore, the user can easily discriminate the data including possible errors due to the battery voltage drop from all the data received. After a battery is restored to a sufficient voltage, the data transmission is resumed automatically. The data may be retransmitted from the following data.

20 Claims, 4 Drawing Sheets

BATTERY-POWERED ACCESSORY FOR RADIO DATA COMMUNICATION OF A DATA PROCESSING APPARATUS

BACKGROUND OF THE INVENTION

1. Field of the Invention

The present invention relates to an accessory of a data processing apparatus, and more specifically to a battery-powered accessory which enables radio data communication of the data processing apparatus.

2. Description of the Related Art

With widely use of personal computers in recent years, many people are in increasing need of data communications between their computers. Such data communications have been usually performed through traditional telephone lines. However, recent miniaturization of personal computers causes the need for wireless communications to be increased. For this reason, there have been proposed various types of radio modems.

For example, a wireless modem described in Japanese Utility-Model Unexamined publication No. Hei 2-8251 is electrically connected with a personal computer through a connector and makes radio communications with peripheral equipment. This wireless modem can be directly connected to the personal computer or the peripheral equipment such as a printer. There is no problem in cases where such a radio modem is powered from a wall socket or a commercial power.

However, when the portable computer is carried around, the radio modem requires a battery of its own in order to avoid hastening the battery consumption of the portable computer. Power Reduction of the personal computer adversely influences the main computing operation thereof.

For a battery-powered radio modem, a voltage drop of the battery is an important problem at all times. When a power supply voltage falls, it becomes impossible to perform a normal data communication, resulting in data errors on sending or receiving. At worst, battery voltage drops put the radio modem out of operation. In order to prevent such a situation, a conventional radio modem equips an alarm function of raising an alarm indicating that a battery voltage falls too low. In general, even though an alarm is issued, the radio modem is capable of operating for a while.

However, in cases where a battery voltage falls low on data communication in the conventional radio modem, no information is given to a user as to how many data have been received or transmitted by the time when an alarm is sounded. Therefore, the user is likely to be led into error such that the data communication would have been completed, and sometimes omits sending of the remaining data. On reverse, although data communication has been completed, the user incorrectly understood such that the data communication would be imperfect, and sometimes transmits the same data again.

SUMMARY OF THE INVENTION

An object of the present invention is to provide a radio communication system comprising a data processing apparatus and a battery-powered accessory thereof in which a data communication is completed without wasting the battery power thereof.

Another object of the present invention is to provide a system comprising a data processing apparatus and a battery-powered accessory for radio data communication which prevents incompletion of data communication even though a battery alarm is raised.

Still another object of the present invention is to provide a system comprising a data processing apparatus and a battery-powered accessory for radio data communication which prevents needless retransmission even though a battery alarm is raised.

A system according to the present invention is comprised of a data processing apparatus and a battery-powered accessory thereof which is provided with a display on a surface thereof. The accessory is comprised of a data counter for detecting the amount of data which have been passed through the accessory. A voltage reduction of the battery is monitored at all times. When the voltage reduction of the battery is detected, an alarm is issued and the communication information including the amount of data is displayed on the display. Preferably, the communication information further comprises an identification number of the opposite party communicating with the data processing apparatus.

In cases where the data processing apparatus transmits data to the opposite party through the accessory, a transmission halt is made when the voltage reduction of the battery is detected. Ant then retransmission of the remainder of the data to be transmitted is started when the battery is restored to a sufficient voltage.

According to the present invention, a battery-powered accessory monitors the amount of transmitting/receiving data at all times. When a voltage drop of the battery is detected, the accessory displays the amount of data which have been sent or received by that time. The data transmission brings to a halt at the time when the battery voltage drop is detected, but the data receiving operation continues. Since a user can easily obtain the communication information through the display of the accessory 10, the user can determine immediately whether all the data have been transmitted. Furthermore, the user can easily discriminate the data including possible errors due to the battery voltage drop from all the data received.

After a battery is restored to a sufficient voltage, the data transmission is resumed automatically. The data may be retransmitted from the following data. Therefore, all the data to be transmitted are certainly transmitted without consuming needless power.

DETAILED DESCRIPTION OF THE PREFERRED EMBODIMENT

Figure 1:
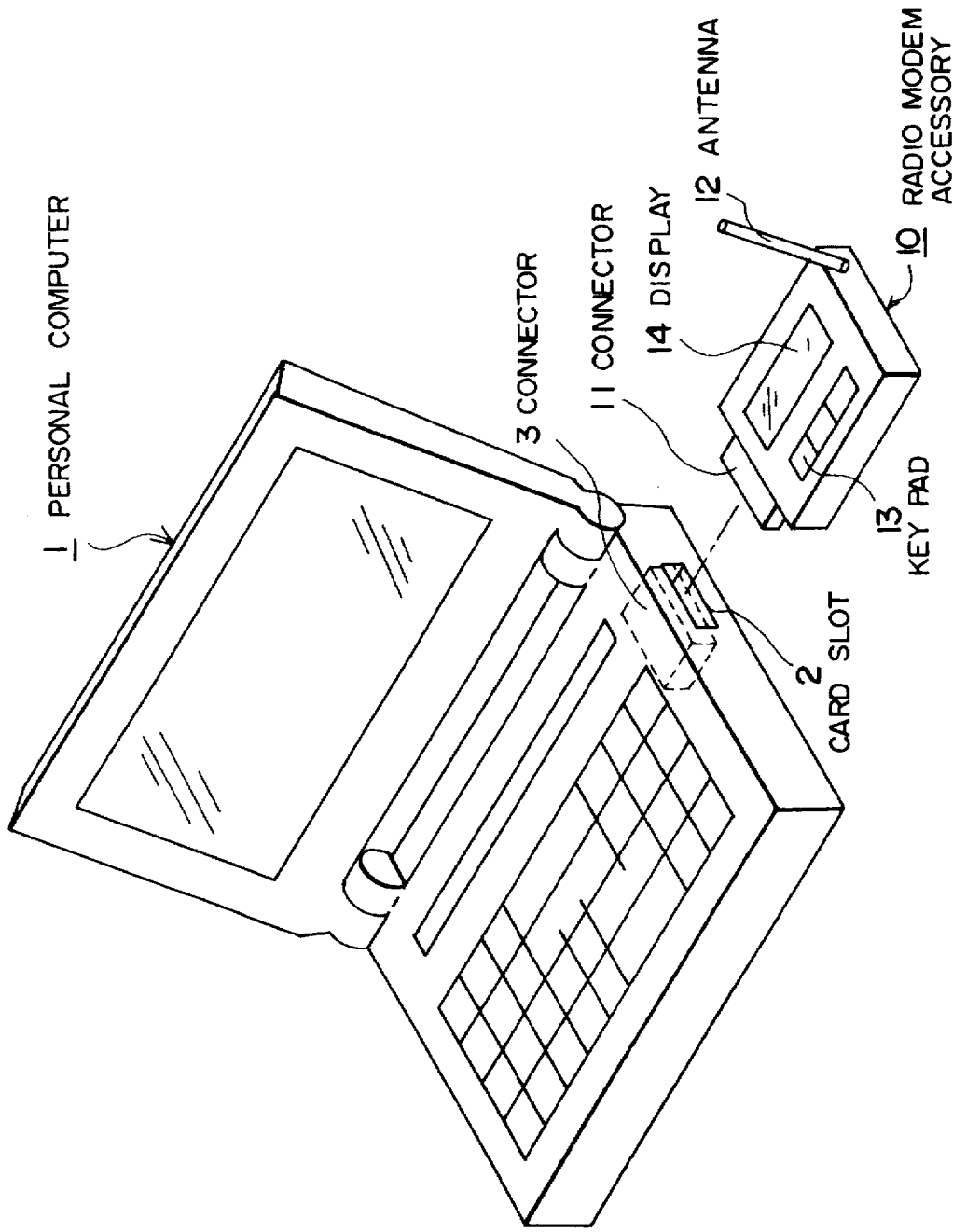
FIG. 1 is a perspective view showing a personal computer having a card slot and a radio modem accessory according to an embodiment of the present invention.

Referring to FIG. 1, a personal computer 1 is provided with a card slot 2 in the side wall thereof. A connector 3 in conformity to PCMCIA interface is equipped within the card slot 2. As for a radio modem accessory 10 of a card type, a connector 11 is provided on one side and an antenna 12 for radio communication is provided on the other side thereof. By inserting the connector 11 into the card slot 2 of the computer 1, the radio modem accessory 10 is electrically connected with the computer 1. The radio modem accessory 10 is further provided with a key pad 13 and a LCD display 14 on the major surface thereof.

Figure 2:
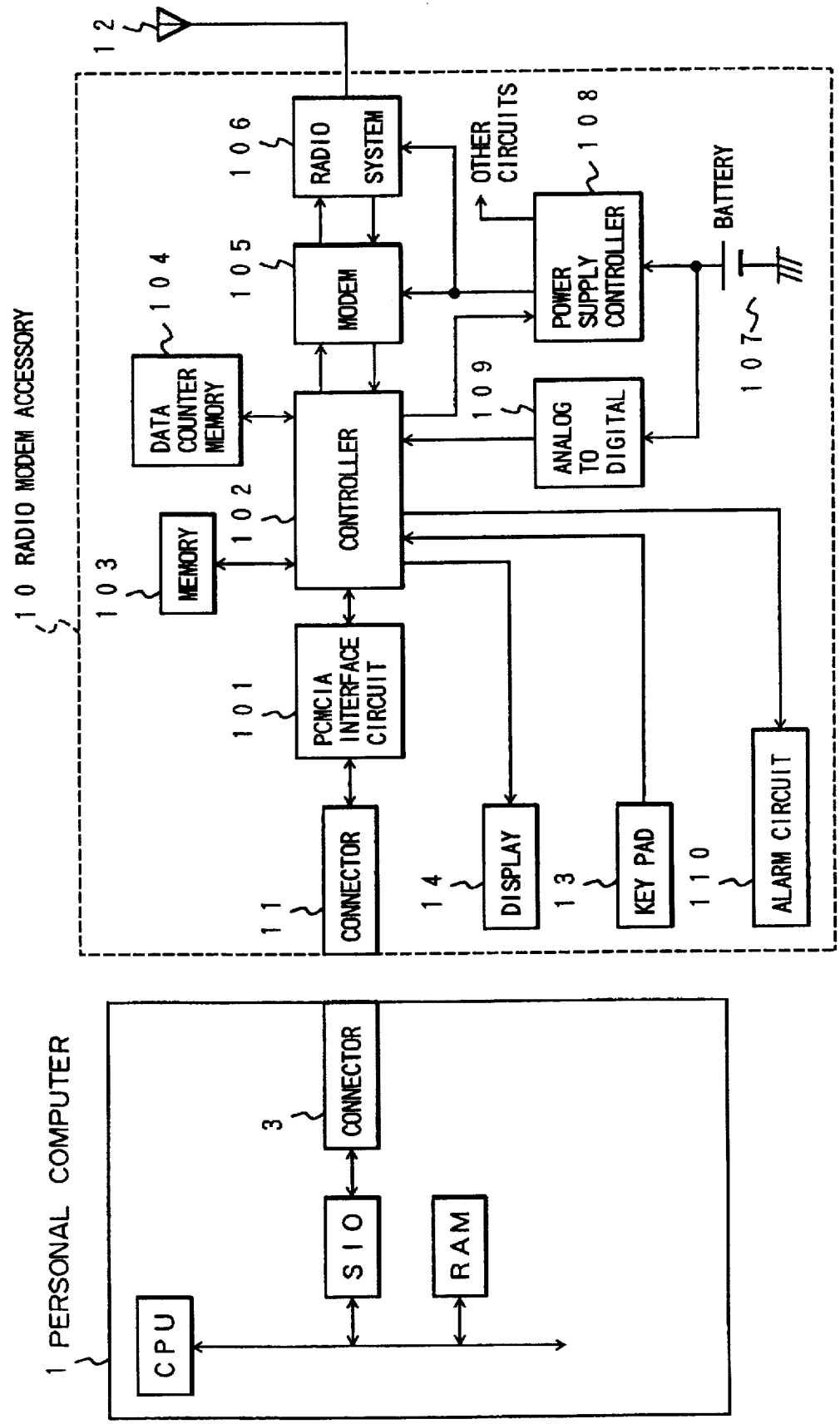
FIG. 2 is a block diagram showing the radio modem accessory according to the embodiment.

As shown in FIG. 2, the radio modem accessory 10 is comprised of a transmitter-receiver portion including a modem, a control portion which controls the transmitting and receiving operation, and a power supply portion including a battery. More specifically, the connector 11 in conformity to PCMCIA specification is connected to an interface circuit 101 of PCMCIA. A controller 102 receives data to be transmitted from the computer 1 through the connector 11 and the interface circuit 101. In reverse direction, the controller 102 inputs receiving data from a modem 105 and sends the receiving data to the computer 1 through the interface circuit 101 and the connector 11.

When inserting the accessory 10 into the computer 1, in other words, powering up the accessory 10, the interface circuit 101 of PCMCIA exchanges data with the computer 1 through the connectors 3 and 11, causing the accessory 10 to be in an I/O operating state of a modem.

The controller 102 performs not only format conversion and transfer of transmitting and receiving data and monitoring of the power supply voltage, but a communication check using a memory 103 and a data counter memory 104 as described later.

The memory 103 stores the identification number of a communicating party and the amount of data which have been received/transmitted under the communication check control of the controller 102. The transmitting/receiving data amount is represented by a frame number in the case of a time sharing data communication and by a data count value in the case of a consecutive communication. The data counter memory 104 retains the frame number of a data frame or a data count value at the time when data transmitting/receiving is stopped under control of the controller 102.

Receiving the data to be transmitted from the computer 1, the controller 102 checks the data amount before sending the data to the modem 105. The transmitting data is converted by the modem 105 and the radio system 106 from a baseband signal to a radio signal. In a reverse direction, a radio signal which is received through the antenna 12 is converted by the radio system 106 and the modem 105 to a baseband signal which is in turn output to the controller 102 for the communication check.

The radio modem accessory 10 is powered by a battery 107. The battery 107 is connected to a power supply controller 108 which supplies power to the modem 105, the radio system 106 and other circuits under control of the controller 102. More specifically, when the radio modem accessory 10 is mounted on the computer 1, the controller 102 activates the power supply controller 108 such that power is supplied to each circuit from the battery 107.

An output voltage of the battery 107 is converted into digital by an analog-to-digital (A-D) converter 109 and the digital signal is output to the controller 102. The controller 102 monitors an output voltage level of the battery 107 through the A-D converter 109 by comparing the output voltage with a reference value preset in advance at all times. When an output voltage fall of the battery 107 is detected, the controller 102 makes an alarm circuit 110 activate and displays the communication check data including the identification number of the communicating party and the amount of data which have been transmitted/received by the time when the voltage drop is detected. The alarm circuit 110 is comprised of an alarm voice generator and a speaker (not shown).

In addition, the output voltage fall of the battery 107 may be detected by a comparator which compares the output voltage of the battery 107 with a reference voltage. In this case, the controller 102 determines whether the output voltage of the battery 107 is reduced in accordance with a comparison result of the comparator.

Transmission Control

Figure 3:
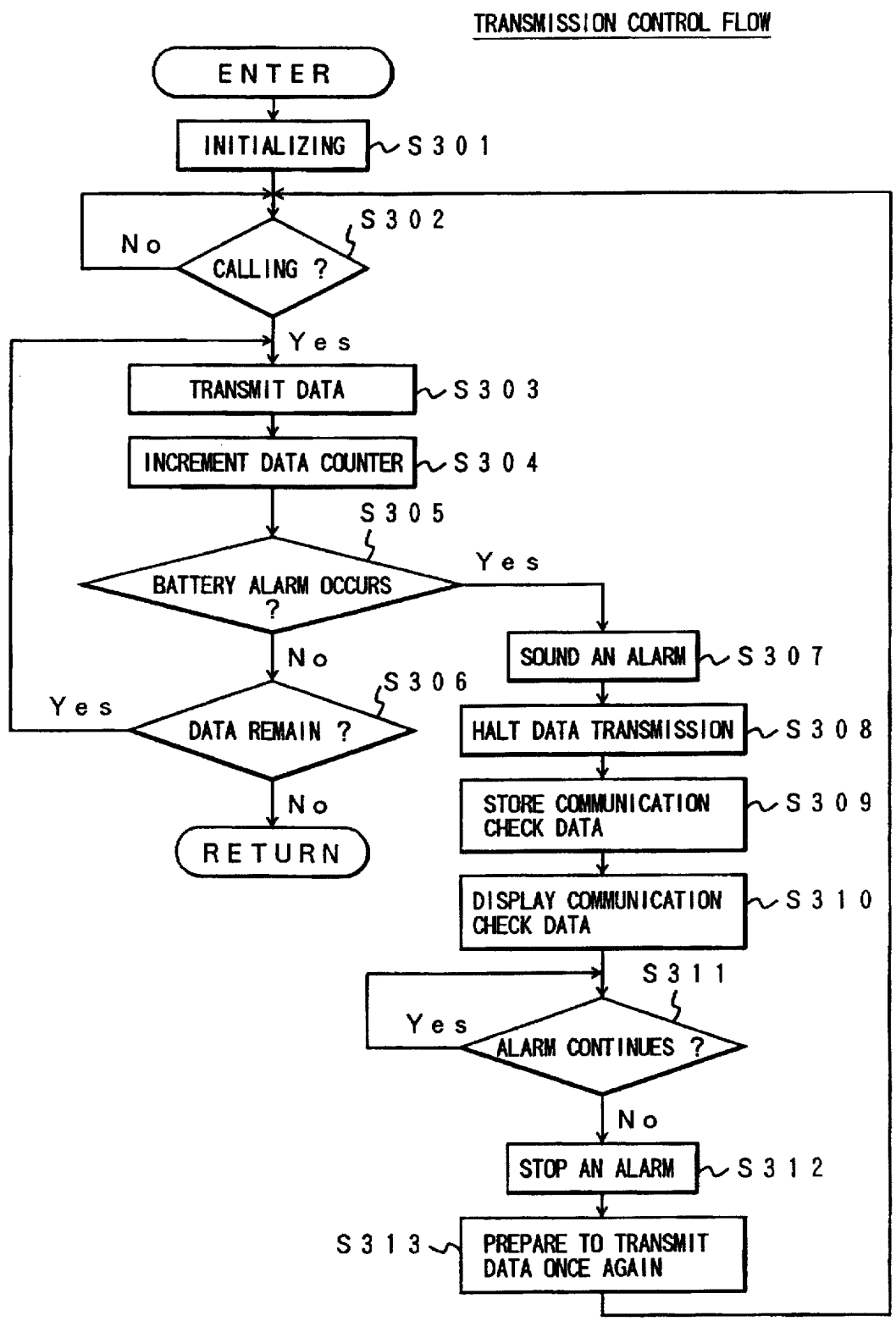
FIG. 3 is a flow chart showing a transmission control operation of the embodiment.

Referring to FIG. 3, first of all, when the accessory 10 is inserted on the card slot 2 of the computer 1, the power supply controller 108 begins to supply power to each circuit. In a transmission mode, initialization is performed (S301) and then the controller 102 turns out to be in a calling standby state (No of S302).

Upon receipt of a connection request from the computer 1, the controller 102 determines whether the connection requested is possible. If the connection request is permitted, (Yes of S302), the controller 102 transfers data in frames from the computer 1 to the modem 105 for transmission (S303). In that case, every time a frame of data is transferred to the modem 105, the controller 102 increments a data count value and writes it on the data counter memory 104 to measure the amount of data transmitted (S304). Alternatively, the frame number of a data frame transferred may be stored on the data counter memory 104.

Subsequently, the controller 102, receiving an output voltage of the battery 107 from the A-D converter 109, determines whether the battery voltage is reduced (S305). If a voltage fall has not been caused (No of S305), it is checked whether the data to be transmitted are left (S306). The steps S303-S306 are repeated until all the data to be transmitted have been sent to the modem 105 except when the battery alarm occurs.

Concerning the step 305, when detecting a voltage fall of the battery 107 (Yes of S305), the controller 102 causes the alarm circuit 110 to sound an alarm to call attention to a user (S307). At the same time, the controller 102 sends a halt signal to the computer 1, which stops the computer 1 from sending data to the accessory 10 (S308). Moreover, when detecting the battery voltage drop, the controller 102 reads the data count value from the data counter memory 104 and stores the data count value as well as the identification number of the communicating party as the communication check data onto the memory 103 (S309). The communication check data and the message of a transmission halt are displayed on the LCD display 14 (S310).

It is to be noted that the communication check data is not limited to the data count value and the identification number of the communicating party. Since all the amount of data to be transmitted is previously known, the controller 102 can calculate the ratio (percent) of the amount of data which have been transmitted by that time to all the amount of data to be transmitted. Such a ratio of the sending completion data may be displayed on the LCD display 14.

While halting a data communication, the controller 102 is checking whether the alarm due to the battery voltage fall is continuing (S311). When a battery voltage is restored to sufficient charge with the passage of time or by replacing the battery 107, the controller 102 stops an alarm (S312) and transits to a data retransmission mode where the controller 102 sends a retransmission request signal to the computer 1 (S313). And, when a reconnection request is received from the computer 1 and the reconnection is possible (Yes of S302), data retransmission is performed once again (S303-S306). In that case, all the data to be transmitted may be transmitted from the beginning once more. Alternatively, only the remaining data may be transmitted based on the data count value of the communication check data stored on the memory 103.

As described above, since the accessory 10 halts transmitting data at a battery voltage drop, it can prevent sending of data including possible errors due to the battery voltage drop. When an alarm is issued, the user of the computer 1 can easily obtain the information of data transmission through the LCD display 14 of the accessory 10. Therefore, the user can determine immediately whether all the data have been transmitted.

In addition, when a battery voltage is restored to a normal value by replacing the battery 107, the computer 1 calls again automatically. Therefore, all the data can be transmitted certainly.

Receiving Control

Figure 4:
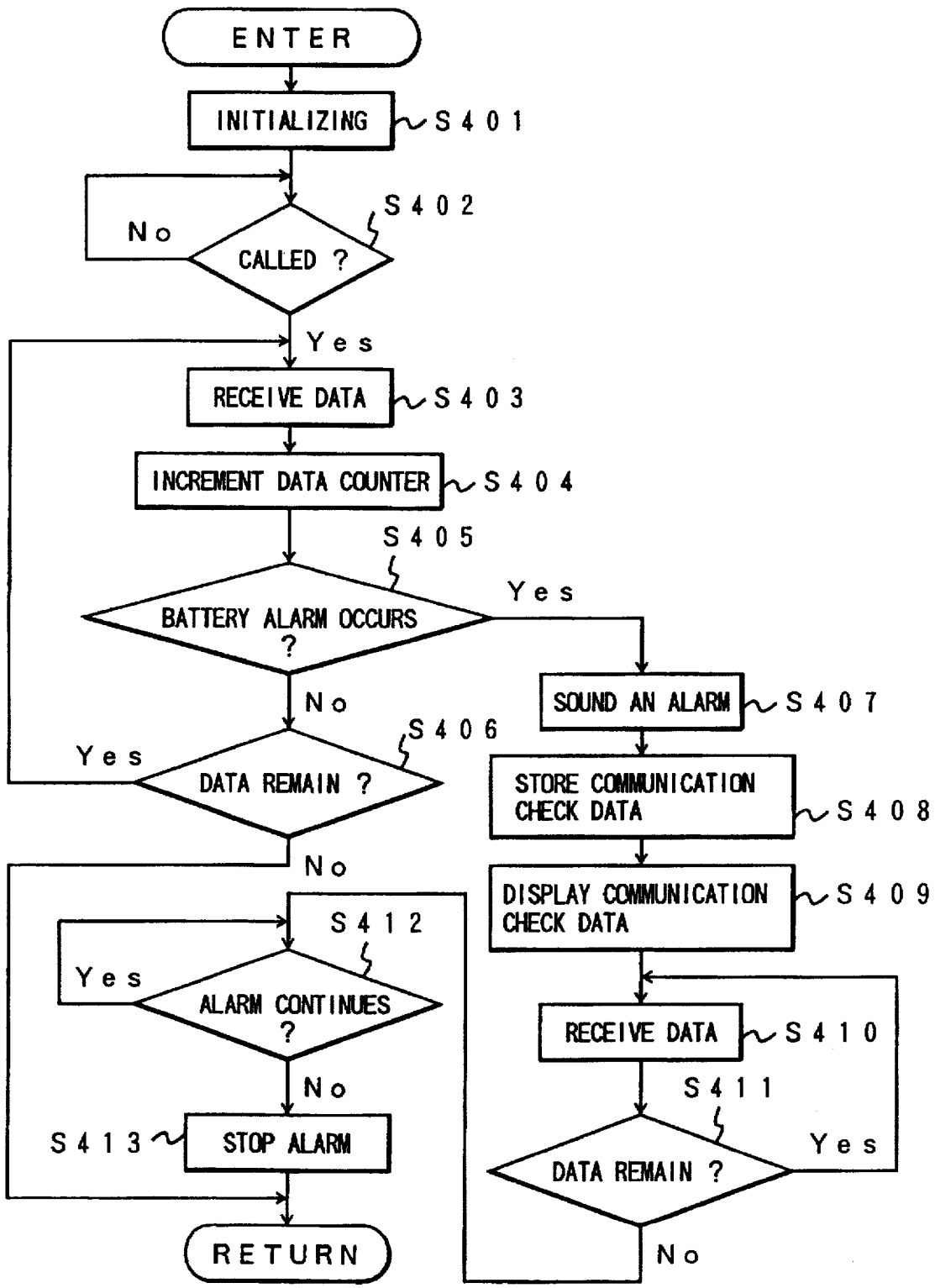
FIG. 4 is a flow chart showing a receiving control operation of the embodiment.

Referring to FIG. 4, in a receiving mode, the controller 102 is in a called standby state (No of S402).

Upon receipt of a connection request from the modem 105, the controller 102 determines whether the connection requested is possible. If the connection request is permitted (Yes of S402), the controller 102 receives data in frames from the modem 105 (S403). In that case, every time a frame of data is received from the modem 105, the controller 102 increments a data count value and writes it on the data counter memory 104 to measure the amount of data received (S404). Alternatively, the frame number of a data frame received may be stored on the data counter memory 104.

Subsequently, the controller 102, receiving an output voltage of the battery 107 from the A-D converter 109, determines whether the battery voltage is reduced (S405). If a voltage fall has not been caused (No of S405), it is checked whether the data received are left (S406). The steps S403–S406 are repeated until all the data have been received from the modem 105 except when the battery alarm occurs.

Concerning the step 405, when detecting a voltage fall of the battery 107 (Yes of S405), the controller 102 causes the alarm circuit 110 to sound an alarm to call attention to a user (S407). At the same time, the controller 102 reads the data count value from the data counter memory 104 and stores the data count value as well as the identification number of the communicating party as the communication check data onto the memory 103 (S408). The message of battery voltage reduction and the communication check data are displayed on the LCD display 14 (S409).

It is to be noted that the communication check data is not limited to the data count value and the identification number of the communicating party. Since all the amount of data to be received is previously known, the controller 102 can calculate the ratio (percent) of the amount of data which have been received by that time to all the amount of data to be received Such a ratio of the receiving completion data may be displayed on the LCD display 14.

Displaying the communication check data on the LCD display 14, the controller 102 receives data from the modem 105 until all the data have been received from the communicating party S410, S411).

After receiving all the data to be received, the controller 102 is checking whether the alarm due to the battery voltage fall is continuing (S412). When a battery voltage is restored to sufficient charge with the passage of time or by replacing the battery 107 (No of S412), the controller 102 stops an alarm (S413) and terminates the receiving operation.

As described above, when detecting a battery voltage reduction, the accessory 10 displays the amount of data which have been received so far and continues to receive data until all the data have been received. When an alarm is issued, the user of the computer 1 can easily discriminate the data including possible errors due to the battery voltage drop from all the data received by looking at the display 14.

What is claimed is:

1. A system comprising a data processing apparatus and an accessory of the data processing apparatus, the accessory comprising:

a battery for a power supply of the accessory;

a display provided on a surface of the accessory;

a first interface circuit for providing a first interface to a radio channel through which the data processing apparatus is communicated with an opposite party;

a second interface circuit for providing a second interface to the data processing apparatus;

data detecting means for detecting an amount of data which have been passed through the first interface circuit and the second interface circuit;

battery detecting means for detecting a voltage reduction of the battery; and control means for displaying communication information on the display, the communication information comprising the amount of data when the voltage reduction of the battery is detected.

2. The system according to claim 1, wherein the communication information further comprises an identification number of the opposite party.

3. The system according to claim 2, wherein the communication information further comprises a message of the voltage reduction of the battery.

4. The system according to claim 1, wherein the communication information further comprises a message of the voltage reduction of the battery.

5. The system according to claim 1, wherein the accessory further comprises an alarm means for issuing an alarm when the voltage reduction of the battery is detected.

6. The system according to claim 1, wherein the data detecting means comprises:

count means for counting data frames which have been passed through the first interface circuit and the second interface circuit; and memory means for storing a count value of the count means when the voltage reduction of the battery is detected.

7. The system according to claim 1, wherein the data detecting means comprises:

first memory means for storing a frame number of data frame passing through the first interface circuit and the second interface circuit; and second memory means for storing the frame number when the voltage reduction of the battery is detected.

8. The system according to claim 1, wherein the control means sends a halt signal of data transmission to the data processing apparatus when the voltage reduction of the battery is detected.

9. The system according to claim 1, wherein the control means sends a retransmission signal to the data processing apparatus when the battery is restored to a sufficient voltage.

10. The system according to claim 9, wherein the retransmission signal includes a signal indicating the amount of data when the voltage reduction of the battery is detected.

11. The system according to claim 10, wherein the data processing apparatus retransmits remainder of data to be transmitted in accordance with the signal.

12. The system according to claim 1, wherein the second interface circuit comprises a connector, conforming to PCMCIA standard.

13. The system according to claim 1, comprising a card modem.

14. A method for radio communication in a system comprising a data processing apparatus and an accessory of the data processing apparatus, the accessory comprising:

a battery for a power supply of the accessory;

a display provided on a surface of the accessory;

a first interface circuit for providing a first interface to a radio channel through which the data processing apparatus is communicated with an opposite party; and a second interface circuit for providing a second interface to the data processing apparatus, the method comprising the steps of:
   a) detecting an amount of data which have been passed through the accessory;
   b) detecting a voltage reduction of the battery; and
   c) displaying communication information on the display, the communication information comprising the amount of data when the voltage reduction of the battery is detected.

15. The method according to claim 14, wherein the communication information further comprises an identification number of the opposite party.

16. The method according to claim 14, further comprising the step of issuing an alarm when the voltage reduction of the battery is detected.

17. The method according to claim 14, further comprising the step of sending a halt signal of data transmission to the data processing apparatus when the voltage reduction of the battery is detected.

18. The method according to claim 14, further comprising the step of sending a retransmission signal to the data processing apparatus when the battery is restored to a sufficient voltage.

19. The method according to claim 18, wherein the retransmission signal includes a signal indicating the amount of data when the voltage reduction of the battery is detected.

20. The method according to claim 19, wherein the data processing apparatus retransmits remainder of data to be transmitted in accordance with the signal.

* * * * *